(12) United States Patent
Smilansky et al.

(10) Patent No.: US 11,528,466 B2
(45) Date of Patent: Dec. 13, 2022

(54) METHOD AND SYSTEM TO CALIBRATE A CAMERA CLOCK USING FLICKER

(71) Applicant: EMZA VISUAL SENSE LTD., Givatayim (IL)

(72) Inventors: Zeev Smilansky, Meishar (IL); Tomer Kimhi, Tel Aviv (IL)

(73) Assignee: EMZA VISUAL SENSE LTD., Givatayim (IL)

( * ) Notice: Subject to any disclaimer, the term of this patent is extended or adjusted under 35 U.S.C. 154(b) by 0 days.

(21) Appl. No.: 17/246,743

(22) Filed: May 3, 2021

(65) Prior Publication Data

US 2021/0258561 A1 Aug. 19, 2021

Related U.S. Application Data

(63) Continuation-in-part of application No. 16/293,686, filed on Mar. 6, 2019, now abandoned.

(60) Provisional application No. 62/640,045, filed on Mar. 8, 2018.

(51) Int. Cl.
*H04N 13/296* (2018.01)
*G06T 7/80* (2017.01)
*H04N 17/00* (2006.01)
*H04N 5/235* (2006.01)
*H04N 5/353* (2011.01)

(52) U.S. Cl.
CPC ............. *H04N 13/296* (2018.05); *G06T 7/85* (2017.01); *H04N 5/2351* (2013.01); *H04N 5/2353* (2013.01); *H04N 5/2357* (2013.01); *H04N 5/353* (2013.01); *H04N 17/002* (2013.01)

(58) Field of Classification Search
None
See application file for complete search history.

(56) References Cited

U.S. PATENT DOCUMENTS

| | | | |
|---|---|---|---|
| 2006/0158531 A1* | 7/2006 | Yanof | H04N 5/2351 348/226.1 |
| 2007/0085912 A1* | 4/2007 | Hakola | H04N 5/2357 348/227.1 |
| 2011/0186714 A1* | 8/2011 | Hung | G01J 1/44 250/2 UAL |
| 2018/0041684 A1* | 2/2018 | Hilldore | H04N 5/2357 |
| 2018/0080877 A1* | 3/2018 | Hirawake | H04N 5/2351 |

* cited by examiner

*Primary Examiner* — Quan Pham
(74) *Attorney, Agent, or Firm* — Alphapatent Associates, Ltd; Daniel J. Swirsky

(57) ABSTRACT

A method operable by circuitry including an image processor, an image sensor, and another clock-dependent device, including measuring a flicker using the image sensor, adjusting a clock rate of the circuitry according to the measured flicker, and operating the clock-dependent device using the adjusted clock rate.

13 Claims, 9 Drawing Sheets

METHOD AND SYSTEM TO CALIBRATE A CAMERA CLOCK USING FLICKER

FIELD OF THE INVENTION

The present invention relates to digital devices such as CMOS image sensors (CSI) utilized for acquiring images under artificial illumination presenting non-uniform exposure of consecutive images when the CSI's clock and the illumination frequencies are imperfectly matched.

BACKGROUND OF THE INVENTION

Many illumination devices, including incandescent light bulbs, fluorescent lamps, and LED lamps that are fed from the mains current provide an illumination that fluctuates, usually at double the frequency of the mains power, that is, 100 Hz where the current is 50 Hz, and 120 Hz where the current is supplied at 60 Hz. The impact of the periodic changes in the power supply on the illumination devices may not be detected or recognized by the human eye. However, electronic devices such a cellular telephones, cameras, and computers which are configured to capture multiple images in a rapid manner, may be impacted by this high frequency of lighting. The results in some cases may be a flickering effect in the digital image display, and in other cases may negatively impact image analysis algorithms. The flickering effect may be seen as a change in brightness between image frames or between image lines. The flickering effect may be seen in both rolling and global electronic shutter modes despite the difference between the operation modes of such implementations. The flickering effect is caused by mis-coordination between the frequency of the mains power supply and the frequency of the image capturing.

SUMMARY OF THE INVENTION

The present invention discloses a method operable on a computerized circuitry employing an image sensor, designed to capture multiple images in a succession. Said method can be utilized to synchronize the clock rate, also known as clock cycle rate, of a device's circuitry with the frequency of a full cycle of the illumination modulation which in some cases may be caused by the main power line frequency. Synchronizing the clock rate with the frequency of a full cycle of said illumination modulation may be utilized in diverse operational tasks in electronic devices, for example, mitigating the flickering phenomena in electronic devices. In some cases, the circuitry may be connected or implemented to electronic devices such as cellular telephones, cameras, video cameras, web cameras, computers, CIS, and the like, requiring high degree of synchronization between the clocks of the communicating devices.

The method disclosed in the present invention can comprise a process which can adjust the circuitry system's clock rate and in parallel set the pixel integration time of the image sensor. The pixel integration time may determine the number of clock cycles executed in a pixel integration time. The pixel integration time in an imaging device is defined as the time frame utilized by the sensing elements in the image sensor to collect photon charges on the image sensor's pixels' electronic wells. The circuitry can be configured with a portion of computerized instructions designed to change the pixel integration time by modifying the number of the clock cycles required to complete a pixel integration time, also denoted as pixel integration cycle.

According to some embodiments of the present invention the method operable by a circuitry comprises an image processor and an image sensor, comprising: capturing at least three sets of pixel arrays. The operation of capturing a set of pixel arrays can comprise:
 (i) setting a clock rate associated with an image intensity value, wherein the clock rate defines the number of clock cycles per pixel integration time by defining the clock rate of the circuitry,
 (ii) capturing a set of pixel arrays, wherein said set of pixel arrays represents a digital image captured by the image sensor, and wherein the image sensor captures pixel arrays provided in a condition of an illumination frequency;
 (iii) computing the image intensity variability value of the captured set of pixel arrays;

In some cases, the method disclosed herein may also be configured to utilize the image intensity variability values associated with the at least three sets of pixel arrays to compute the estimated lowest image intensity variability value. Then, the method disclosed herein may also be configured to set the clock rate associated with the image intensity variability value computed as the estimated lowest image intensity variability value to be the defined-clock-rate. After setting the clock rate which is associated with the image intensity variability which is defined as the estimated lowest image intensity variability value as the defined-clock-rate, additional operation of capturing images from the image sensor, can take place by the circuitry, wherein the clock rate of the circuitry is set to be the defined-clock-rate.

In some embodiments of the present invention, the method disclosed in the present invention further comprises setting the clock rate defining the number of clock cycles per pixel integration time by defining the clock rate of the circuitry and capturing additional pixel arrays from the image sensor and computing additional image intensity variability values in case the at least three sets of pixel arrays do not allow estimation of the lowest image intensity variability value. In some other cases, said method further comprises setting the clock rate defining the number of clock cycles per pixel integration time by defining the clock rate of the circuitry, in case none of the at least three sets of pixel arrays yields an estimated lowest image intensity variability value, wherein the estimated lowest image intensity variability value is the lowest image intensity variability value among the computed variability values.

In some embodiments of the present invention, after setting the pixel integration time of the image sensor to be a certain number of clock cycles, the grey level intensities of a pixel array, captured from the image sensor during a pixel integration time, may be measured. For example, the pixel array may be the entire image frame captured by the image sensor. In such a case, the grey level intensity may be measured at the entire image frame captured during the pixel integration time. In some other exemplary cases, the pixel array may be one or more lines of pixels in the image sensor. In some cases, the method disclosed herein can also define a process of computing the image intensity variability value of the captured a plurality of pixel arrays. The term "variability" and/or "variability value" are defined as any measurable difference or non-uniformity of a set of values such as fluctuation of values, maximum value minus minimum value, standard deviation, variance, amplitude of a waveform, and the like.

The image intensity variability value measured in the multiple pixel arrays can be utilized to identify the clock rate required to capture a certain number of clock cycles in a pixel integration time. Thus, the circuitry may be designed with the ability to change the number of clock cycles and thereby the number of clock cycles per pixel integration time. For example, the circuitry may measure the image intensity of a first set of 20 image frames captured using a constant pixel integration time of 60,000 clock cycles, and then compute the image intensity variability value of the first 20 image frames. is defined as the accepted measure of the intensity of a digital image's pixel brightness, often called "gray level" and measured in ranges of 8 bytes (0-255), 16 bytes (0-65535) or other ranges. As a part of this measurement process in this exemplary case, the circuitry may correct the clock cycle by changing the pixel integration time to be 60,006 clock cycles, measure the intensity of second set of 20 image frames captured using said constant pixel integration time of 60,006 clock cycles, and then compute the image intensity variability value of second 20 image frames. Comparing the image intensity variability value (or line intensity variability for rolling shutters) with the 60,000 integration timing to that with the 60,006-integration timing is the first step towards determining the optimal integration timing to appearance of the illumination fluctuations.

In some embodiments of the present invention the measured image intensity variability value can be utilized to compute the estimated integration clock counts yielding the estimated lowest image intensity variability value. In some cases, the estimated lowest image intensity variability value can be as the lowest image intensity variability value among the computed variability values. For example, image intensity variability value of the first 20 image frames and the second 20 image frames may be utilized to identify whether the first set of 20 image frames or the second set of 20 image frames has the lower variability value, wherein the variability value is a numeric value indicate the level of light intensity of a captured frame. In some cases, additional sets of image frames, at different pixel integration timings may be measured and utilized to identify the estimated clock rate required to reach to the lowest point of the variability in a set of pixel arrays. The identified number of clock cycles required to reach to the lowest point of the intensity variation in the pixel arrays may be utilized by the circuitry to determine the required clock rate. Thus, the length of a pixel integration time may be synchronized with the frequency of the illumination modulation by adjusting length of a pixel integration time through changing the clock rate of the electronic device. In some cases, the frequency of the illumination modulation may be caused by the main power line frequency. In some cases, setting the number of clock cycles of the pixel integrating time may mitigate the flickering phenomena caused by illumination frequency and a video movie may be seen essentially steady to the average human observer.

In some cases, accuracy of the circuitry clock may also be necessary for diverse aspects of the circuitry operations such as interfacing with external devices such as digital processors which mandate accurate synchronization between the clock rate of the circuitry processor and the external device. Thus, using the illumination modulation to improve the accuracy of the circuitry processor clock can reduce the requirement for on-board high accuracy clocks which can be expensive and/or complicated, or the need for a high accuracy external clock.

In some embodiments of the present invention, the circuitry utilized to operate the method disclosed herein may comprise the image sensor and at least one computing unit. In some cases, the circuitry may also comprise a computer-readable storage medium, denoted as a memory unit, configured to store digital data required for the circuitry operation. In some cases, the computing unit, or units may store instructions which can be executed by the at least one computing unit of the circuitry and thereby cause the circuitry to perform computerized processes implementing the methods disclosed in the present invention.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

The present invention discloses a method operable on a circuitry within an image sensor, wherein the circuitry may be implemented or connected to electronic devices and designed to capture multiple images or lines by the image sensor. Such an image sensor can comprise a photosensitive cell array designed to transduce optical image of objects formed on the photosensitive cell array by incidence of light, into corresponding electronic signals, denoted herein as a captured image frame, representing the image captured by the image sensor.

The method disclosed by the present invention is designed to utilize image intensity variability value to synchronize the clock rate of the electronic device by ensuring that the number of clock cycles per pixel integration time may be synchronized, hence occur at the same rate as the frequency of the illumination frequency.

The term "clock rate" refers to the frequency at which a processor such as a central processing unit is running. The clock rate is a numeric value used as an indicator of the processor's speed. The clock rate of a processor is normally determined by the frequency of a controlled oscillator inside the processor. In some cases, the clock rate may be defined by a reference frequency defined by a clock signal from the motherboard. In some cases, the clock rate can be changed by setting certain registers in the processor. The term "clock cycle" or "clock cycles" is a numeric value referring to the number of occurrences of a repeating clock cycle. In some cases, the clock cycle is measured as clock cycles per second or its equivalent.

The present invention disclosed herein provides a method to adjust the clock rate and thereby the clock cycles per pixel integration time. For example, setting the clock rate to a certain numeric value defines the frequency of the processor, thereby defines the number of clock cycles per pixel integration time, and there by defines the time length of the integration time.

Figure 1A:
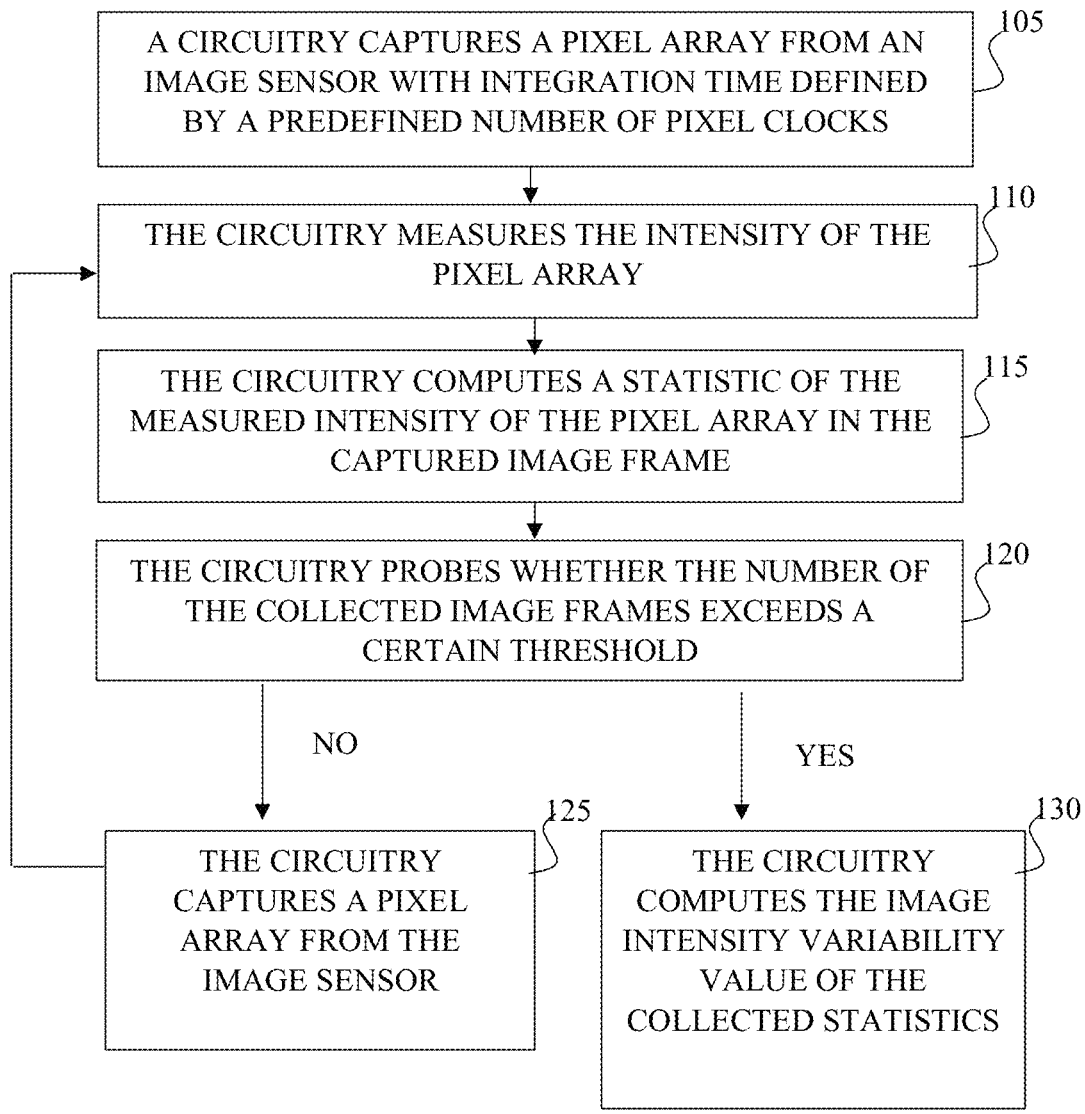
FIG. 1A discloses a method for computing the image intensity variability value of a plurality of image frames captured by a capturing operation of the entire image frame according to exemplary embodiments of the present invention.

FIG. 1A discloses a method for computing the image intensity variability value of a plurality of image frames captured by a capturing operation of the entire image frame according to exemplary embodiments of the present invention. At step 105 a circuitry captures a pixel array from an image sensor using a pixel integration time defined by a certain clock rate, wherein the image sensor captures pixel arrays provided in a condition of an illumination frequency. In some cases, such a condition of an illumination frequency may occur in a light source which influenced by the amplitude and/or phase. In some cases, the illumination frequency may cause by alternation of the alternating current provided by the power grid. In some cases, the pixel array may comprise the entire image frame. For example, in case the circuitry is utilized in a global shutter implementation, wherein the image sensor exposes all the pixel lines of an image sensor at the same time. At step 110 the circuitry measures the image intensity in the captured pixel array. In some case, the measurement of the image intensity yields a numeric value. Such an image intensity value can be defined as the intensity level of the light captured by the sensor. The intensity may be a measurement of the wavelength-weighted power captured by image sensor. In some cases, the circuitry may be configured to measure the image intensity level by measuring the grayscale of the captured image, or the values of one of the color channels R, G, or B or the transformed luminance or an infra-red (IR) channel if such exists or any other metric indicative of the amount of light captured in the given pixel integration times. The circuitry may also be configured to convert the wavelength-weighted power captured by image sensor to numeric values which can be utilized in the method disclosed herein. At step 115 the circuitry computes one or more statistic values of the light intensity in the captured image frame, out of the numeric values representing the light intensity. For example, in case of a resolution of 640×480 the circuitry may utilize the processing units to calculate the average of the light intensity per pixel in the 640×480 image frame. The circuitry may also utilize some registers in the circuitry to store the values resulted of the calculation.

At step 120 the circuitry probes if the number of captured image frames which has started to be captured at step 105 exceeds a certain threshold value. In some cases, the certain threshold value may be a predefined numeric value stored in the circuitry components. For example, the circuitry may comprise a memory buffer, a memory register, a memory unit, and the like, configured to hold and store predefined values required for the circuitry operations. In such an exemplary case, the circuitry may hold a predefined threshold value stored in a memory, and which can be utilized to determine the number of captured image frames. At step 125 the circuitry captures additional pixel arrays from the image sensor during a certain number of clock cycles. Said pixel arrays may be provided in diverse conditions of illumination phases or intensity levels Then, upon completion of step 125 the circuitry may measure the light intensity in the additional captured image.

At step 130 the circuitry computes the image intensity variability value of the collected image frames. The image intensity variability value defined herein as a statistical value indicating the dispersion of the intensity of the light levels in the measurements.

In such cases, the image intensity average or median or another statistic of the captured image may be utilized to capture the image intensity variability value in the captured image frames. For example, the circuitry may compute the variability of the average/median value of the captured image frames.

In some embodiments of the present invention, diverse methods can be utilized for determining the clock rate, of the circuitry, which minimizes the variability between frames captured at the same pixel integration time. For example, the circuitry can measure the variability across a range with a relatively coarse step. For examples, the pixel integration times can be with the clock rate of 59950, 59960, 59970, . . . , 60050, pixels. Then, the circuitry can define the pixel integration time with the clock rate which provides the minimal variability in the corresponding set of images. Then, in some cases, a second process of choosing pixel integration time can be repeated with a finer step. For example, in case the optimal pixel integration time were identified with 60010 pixels, the second process of identifying pixel integration time can be set with one clock rate among the following list: 60005, 60006, 60007, . . . , 60015. Then, the clock rate can be set according to the clock rate of the optimal pixel integration time at the second process.

In some cases, an alternative approach may be utilized by using a certain number of different pixel integration timings, for example, five measurements of pixel integration time lasting the following clock rates: 59950, 59975, 60000, 60025, and 60050. Then, the circuitry may fit a parabola representing the pixel integration time measurements. The circuitry may be able to compute the point of the minimum of the defined parabola representing the pixel integration time measurements. The computed minimum in the parabola can be used to set the required length time and thereby to set the clock rate.

Figure 1B:
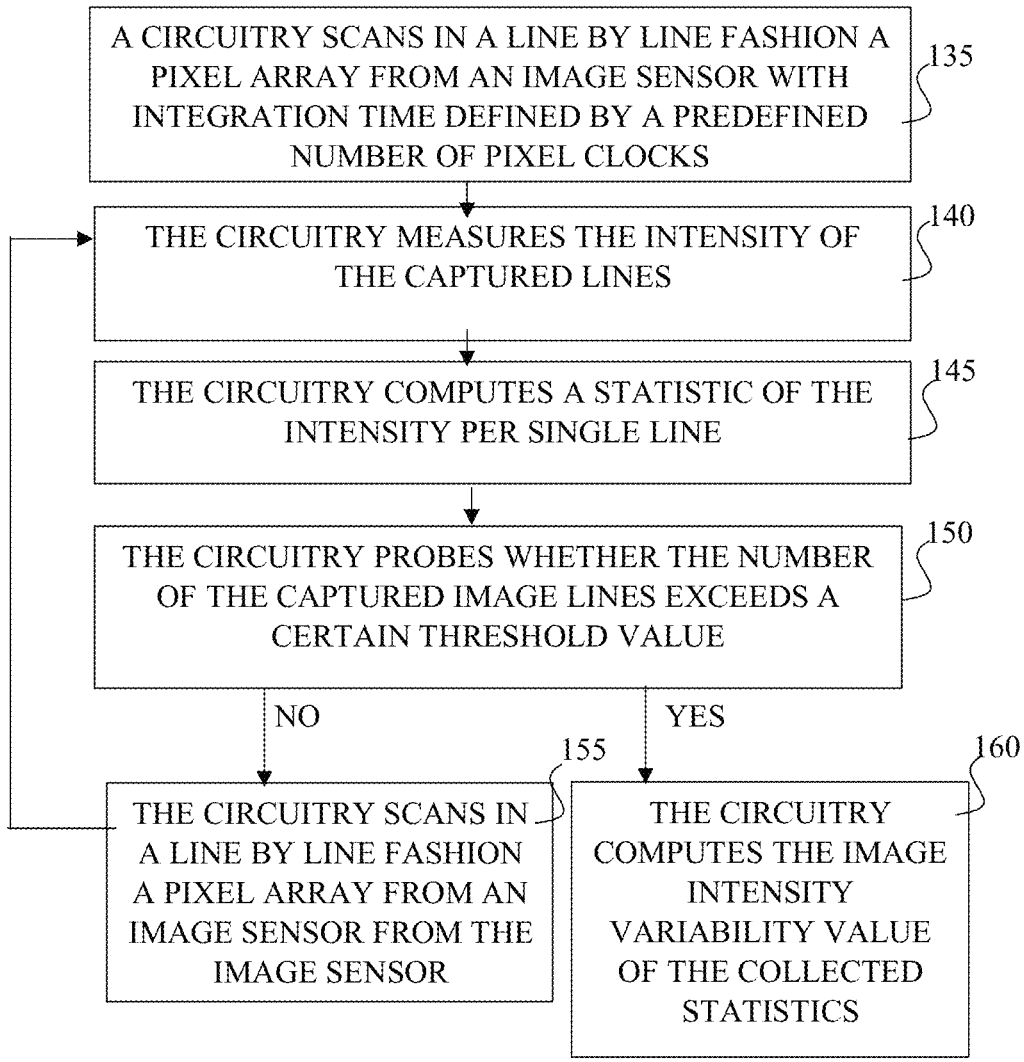
FIG. 1B discloses a method for computing the image intensity variability value in a plurality of pixel arrays captured across the image frame lines, according to exemplary embodiments of the present invention FIG. 2A discloses a method for defining at least three numeric values of clock rates and measuring the intensity variability values of the corresponding pixel arrays thereof, according to exemplary embodiments of the present invention.

FIG. 1B discloses a method for computing the image intensity variability value in a plurality of pixel arrays captured across the image frame lines, according to exemplary embodiments of the present invention. At step 135 a circuitry captures a pixel array from an image sensor by reading the image frame in a line-by-line fashion. The image frame captured in a line-by-line fashion, may be captured either vertically or horizontally, from the image sensor according to the image sensor design. The pixel lines in the captured pixel array may be captured from an image sensor during a pixel integration time defined by a certain clock rate. In some cases, the clock rate may be provided or determined by the circuitry. In some other cases, a computerized process operated by a processing unit may provide the clock rate for determine the pixel integration time. In some cases, capturing pixel arrays comprising portions of pixel lines may be utilized in cases the pixel lines in the pixel array are captured gradually and not concurrently, for example in case of a rolling shutter implementation.

In some embodiments of the present invention, the clock rate allocated for pixel integration time during the capturing of the lines of pixels in the pixel array may be derived from the clock rate which determines the pixel integration time of the entire image. For example, if the pixel integration time is set to be a certain clock rate for the entire image, the circuitry may utilize said determined number of clock rate and calculate the number of clock cycles allocated for capturing a single line. At step 140 the circuitry measures the image intensity of the captured lines of the image frame, as aforementioned. At step 145 the circuitry computes a statistic of the image intensity per a single line. The circuitry may also utilize some registers in the circuitry to store the values resulted of the calculation.

At step 150 the circuitry verifies whether the number of captured image lines which has started to be captured at step 135 exceeds a certain threshold value. In some cases, the certain threshold value may be a predefined numeric value stored in the circuitry components. For example, the circuitry may comprise a memory buffer, a memory register, a memory unit, and the like, configured to hold and store predefined values required for the circuitry operations. In such an exemplary case, the circuitry may hold a predefined threshold value stored in a memory, and which can be utilized to determine the number of captured image lines. In some cases, a captured image frame may be a pixel array comprising just a portion of lines of an image.

For example, in case the circuitry captures in a row by row fashion at a 320×680 image resolution, the number of captured lines in the image frame may be equal to or less than 320. The certain threshold value may be a predefined numeric value stored in the circuitry system. For example, the circuitry may comprise a memory buffer, a memory register, a memory unit, and the like, configured to hold and store predefined values required for the circuitry operations. In such an exemplary case, the circuitry may hold a predefined value stored in a memory, and which can utilize to determine the number of captured image lines.

At step 155 the circuitry captures another pixel array comprising some pixel lines from an image sensor during to a certain number of clock cycles, in case the number of captured lines has not exceeded the threshold value. Then upon a completion of step 155 the circuitry may measure the image intensity in the additional captured pixel lines, in a line by line fashion as aforementioned. At step 160 the circuitry may compute the image intensity variability value among the captured image pixel arrays, wherein the captured pixel arrays were captured in a line-by-line fashion. In such cases, the image intensity average of the captured image pixel arrays may be utilized to capture the image intensity variability value in the lines of the captured image frame. For example, the circuitry may compute the variability of the average/median/max/90 percentile or any other useful statistic value of the captured image lines.

Figure 2A:
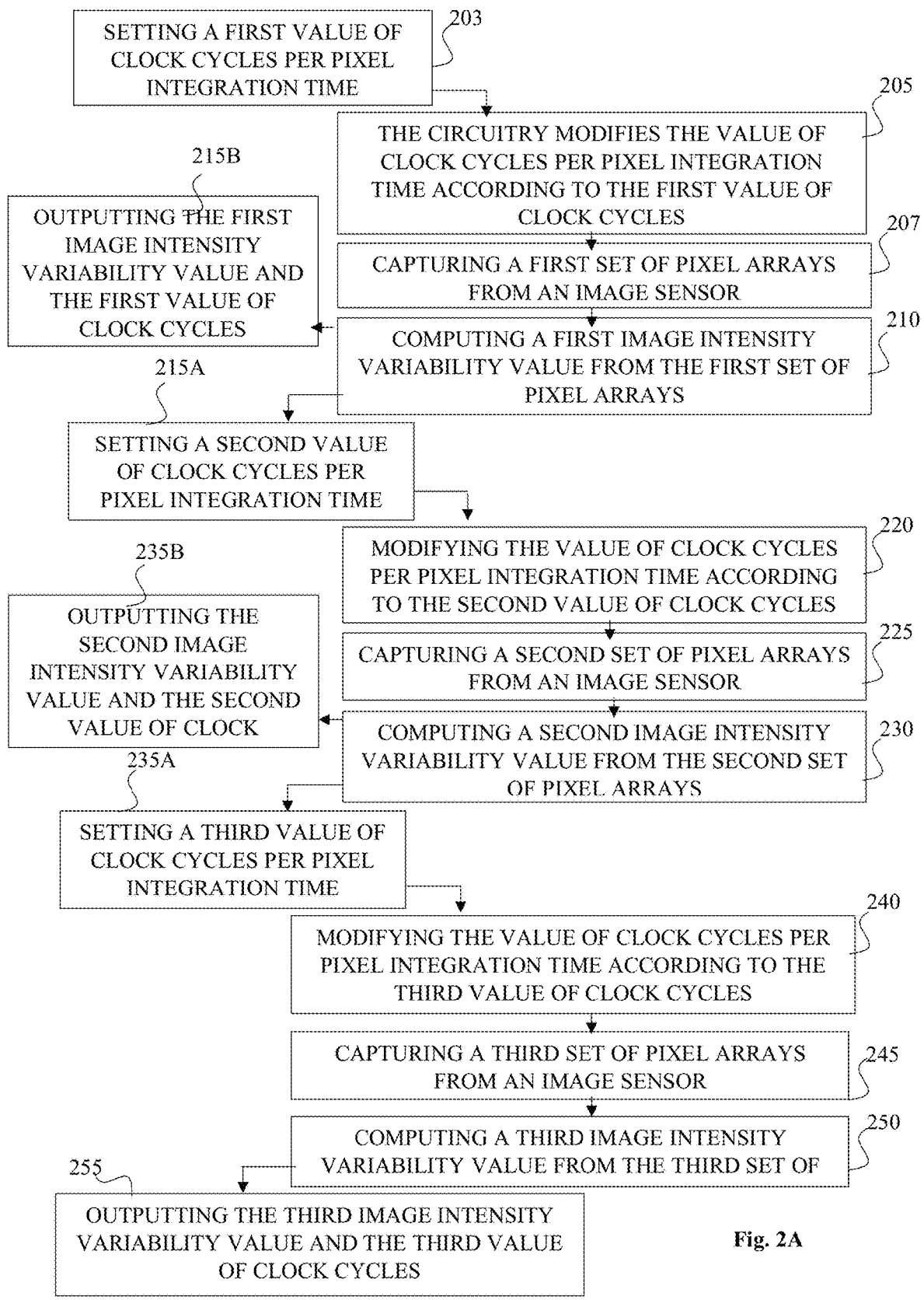
FIG. 2B discloses a method for identifying the estimated lowest image intensity variability value, according to exemplary embodiments of the present invention.

FIG. 2A discloses a method for defining at least three numeric values of clock rates and measuring the intensity variability values of the corresponding pixel arrays thereof, according to exemplary embodiments of the present invention. At step 203 a first value of clock rate is set by the circuitry. Such a value utilized by the circuitry can be a numeric value. In some cases, the numeric value utilized by the circuitry may be obtained by a computerized process operated by the circuitry. For example, a computerized process operated by the circuitry can define the numeric value utilized by the value utilized to set the clock cycles per pixel integration time. At step 205 the circuitry modifies a value of clock cycles per pixel integration time by setting the first clock rate of the circuitry. The first clock rate of the circuitry set at step 203 may be associated with a first image intensity variability value. In some cases, the circuitry may modify the clock rate such that the clock cycles per pixel integration time may lengthen the pixel integration time in a small number of clock cycles. For example, if the internal clock of the camera operates at 6 MHz, and the main power line frequency is 50 Hz so that the illumination fluctuates at 100 Hz and wherein 10 milliseconds are equivalent to 60,000 clock cycles, such that a sample sequence of exposure clock timings aimed to identify, step by step, a suitable synchronization of the clock rate could be 60,000-60,006-60,003-60,004-60,005.

Step 207 the circuitry operates a process, denoted as pixel array capturing process, wherein the pixel array capturing process is configured to capture a first set of pixel arrays from an image sensor, as disclosed above. In some cases, capturing the first set of pixel arrays may be in a line by line fashion, as aforementioned. In some other cases, the first set of pixel arrays may be the entire image frame may be captured, as aforementioned. At step 210 the circuitry computes the first image intensity variability value of the captured pixel arrays, as disclosed above. In some embodiments of the present invention, the pixel arrays may be image frames utilized for computing the image intensity variability value of the entire image frame. For example, in case the image sensor is configured to operate in a global shutter mode of work, pixel arrays may be a certain number of image frames.

In possible embodiments of the of the present invention, the first set of pixel arrays may be a line or a certain number of lines in an image frame utilized for computing the image intensity variability value of an image frame. For example, in case the image sensor is configured to operate in a rolling shutter mode, the pixel arrays may be a line or a certain number of lines of an image frame. In some cases, wherein the pixel arrays are configured to be a line or a certain number of lines in an image frame, the number of lines may be determined such that, the entire image frame may be captured upon completion of the pixel array capturing process defined in step 205.

At step 215B the circuitry outputs the first image intensity variability value and the first value of clock. In some cases, such an output can be to a memory buffer controlled by the circuitry, or by the circuitry's computerized instructions. In some other cases, such an output can be to a memory unit comprises the required registered and structure to store digital data. At step 215A the circuitry, sets a second value of clock rate. Such a value utilized by the circuitry can be a numeric value. In some cases, the second value of clock rate utilized by the circuitry may be obtained by a computerized process operated by the circuitry. For example, a computerized process operated by the circuitry can define the numeric value utilized by the value utilized to set the clock cycles per pixel integration time. At step 220 the circuitry modifies the value of clock cycles per pixel integration time by setting the second clock rate of the circuitry. Such a value utilized by the circuitry can be a numeric value. In some cases, the numeric value utilized by the circuitry may be obtained by a computerized process operated by the circuitry. The second clock rate of the circuitry modified at step 220 may be associated with a second image intensity variability value.

Step 225 the circuitry operates a process, the pixel array capturing process, to capture a second set of pixel arrays from an image sensor, as discloses above. In some cases, capturing the second set of pixel arrays may be in a line by line fashion, as aforementioned. In some other cases, the second set of pixel arrays may be the entire image frame may be captured, as aforementioned. At step 230 the circuitry can compute the second image intensity variability value of the captured pixel arrays, as disclosed above. In some embodiments of the present invention, the pixel arrays may be image frames utilized for computing the image intensity variability value of the entire image frame. For example, in case the image sensor is configured to operate in a global shutter mode of work, pixel arrays may be a certain number of image frames.

At step 235B the circuitry outputs the second image intensity variability value and the second value of clock. In some cases, such an output can be to a memory buffer controlled by the circuitry, or by the circuitry's computerized instructions. In some other cases, such an output can be to a memory unit comprises the required registered and structure to store digital data. At step 235A the circuitry sets a third value of clock rate. Such a value utilized by the circuitry can be a numeric value. In some cases, the third value of clock rate utilized by the circuitry may be obtained by a computerized process operated by the circuitry. For example, a computerized process operated by the circuitry can define the numeric value utilized by the value utilized to set the clock cycles per pixel integration time. At step 240 the circuitry modifies the value of clock cycles per pixel integration time by setting the third clock rate of the circuitry. Such a value utilized by the circuitry can be a numeric value. In some cases, the numeric value utilized by the circuitry may be obtained by a computerized process operated by the circuitry. The third clock rate of the circuitry modified at step 240 may be associated with a third image intensity variability value.

Step 245 the circuitry operates a process, the pixel array capturing process, to capture a third set of pixel arrays from an image sensor, as disclosed above. In some cases, capturing the third set of pixel arrays may be in a line by line fashion, as aforementioned. In some other cases, the third set of pixel arrays may be the entire image frame that is captured, as aforementioned. At step 250 the circuitry can compute the third image intensity variability value of the captured pixel arrays, as disclosed above. In some embodiments of the present invention, the pixel arrays may be image frames utilized for computing the image intensity variability value of the entire image frame. For example, in case the image sensor is configured to operate in a global shutter mode of work, pixel arrays may be a certain number of image frames.

At step 255 the circuitry outputs the third image intensity variability value and the third value of clock. In some cases, such an output can be to a memory buffer controlled by the circuitry, or by the circuitry's computerized instructions. In some other cases, such an output can be to a memory unit comprises the required registered and structure to store digital data.

Figure 2B:
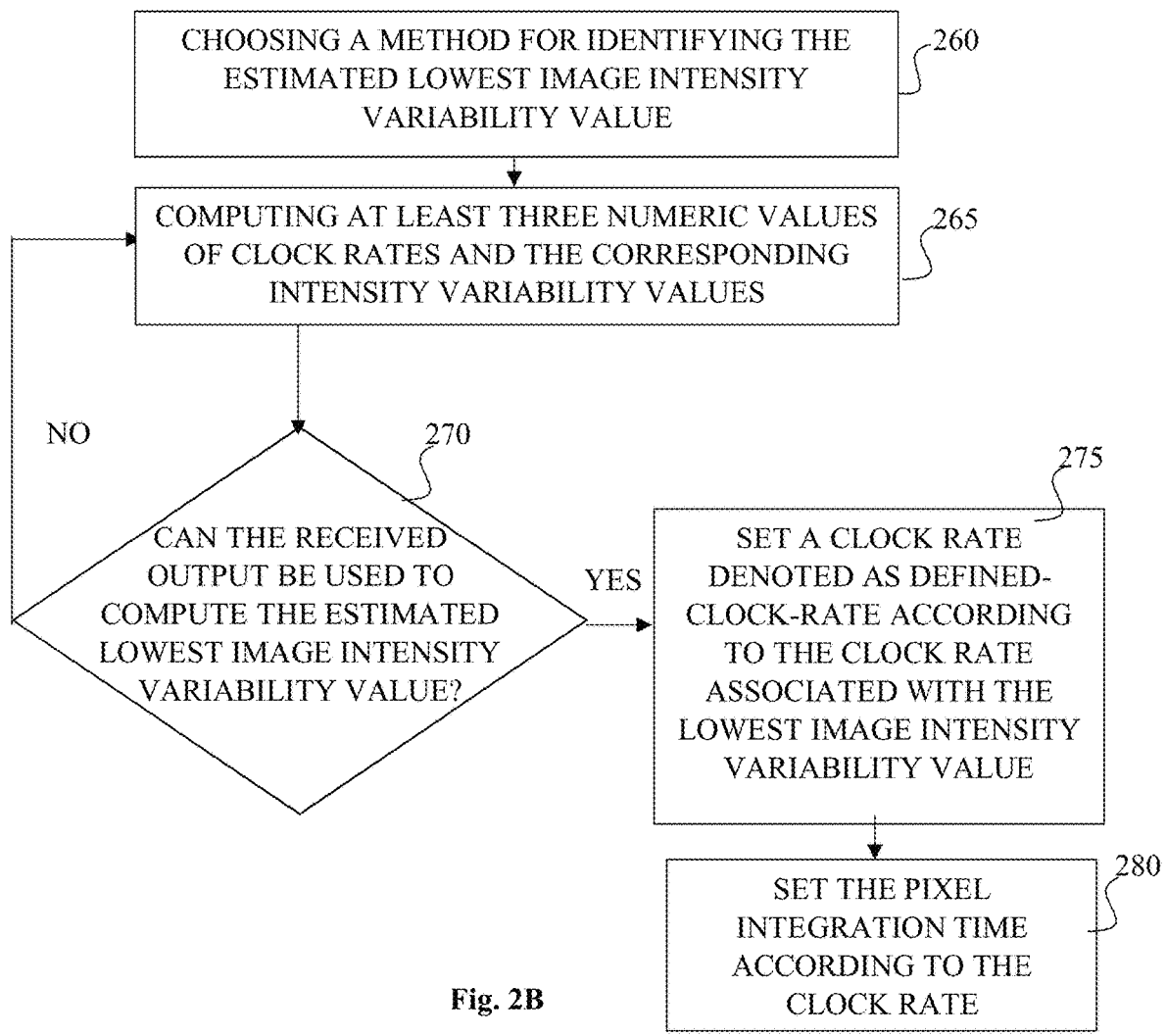

FIG. 2B discloses a method for identifying the estimated lowest image intensity variability value, according to exemplary embodiments of the present invention. At step 260 a circuitry can identify a method for identifying the estimated lowest image intensity variability value. In some cases, the method utilized by for identifying the estimated lowest image intensity variability value may be designed to obtain at least three diverse variability values and identify the minimum value among the at least three diverse variability values. In some cases, other statistic methods may be utilized to calculate the estimated lowest image intensity variability value. For example, a method utilized a standard deviation, or max-min value, curve fitting, approximation theory and the like may also be utilized. In some cases, the method for identifying the estimated lowest image intensity variability value may be any other method known for a person having ordinary skills in the art.

At step 265 the circuitry can obtain at least three image intensity variability values associated with the corresponding clock rate values thereof. In some cases, the circuitry may utilize the method elaborated in FIG. 2A for obtaining image intensity variability values associated with the corresponding clock rate thereof. In some embodiments of the present invention, the circuitry may be configured to utilize the method elaborated in FIG. 2A by providing the first value of clock cycles. In some cases, the circuitry may be configured to utilize the method elaborated in FIG. 2A by providing the first value of clock cycles, and the second value of clock cycles. In some cases, the circuitry may be configured to utilize the method elaborated in FIG. 2A by providing the first value of clock cycles, the second value of clock cycles, and the second value of clock cycles. In such cases, the circuitry may utilize the third computed variability value associated with the third clock rate value, the second computed variability value associated with the second clock rate value, and the first computed variability value associated with the first clock rate value, At step 270 the circuitry may operate a set of computerized instructions which utilizes the third, computed variability value, the first computed variability value and the second computed variability value and verify if the first computed variability value, the second computed variability value, or the third computed variability value, has reached to the estimated lowest image intensity variability value. In some cases, the comparison operation disclosed in step 265 may be utilized to determine if the image intensity variability value, the second image intensity variability value or the first image intensity variability value has reached the estimated lowest image intensity value variability. For example, in case the first image intensity variability value is lower than the second image intensity variability value and the third computed variability value, the first image intensity variability value may be identified as the estimated lowest image intensity variability value. In some cases, such a comparison may comprise comparing numeric values and deciding upon the lowest value among the compared numeric values. In some other cases, such a comparison may comprise comparing numeric values and decide upon the largest value among the compared numeric values. In some cases, if the second image intensity variability value is lower than the first image intensity variability value and the third computed variability value, the second image intensity variability may be identified as the estimated lowest image intensity variability value.

In some cases, not the first image intensity variability value, neither the second image intensity variability value nor the third image intensity variability value can be identified as the estimated lowest image intensity variability value. For example, the process for identifying the estimated lowest image intensity variability value may comprise a method which requires more than three image intensity variability values. In such cases, the estimated lowest image intensity variability value may be between two points, e.g., between the first image intensity variability value and the second. In such cases, the circuitry may be instructed to operate the method elaborated in FIG. 2A for gaining additional image intensity variability values associated with the clock rate values thereof.

In some cases, the computerized instructions may comprise an additional pixel array capturing process to compute more computed statistic values which can be utilized to verify if the additional computed variability value has reached to the estimated lowest image intensity variability value. In some other cases, other methods for finding successively approximations for zeros in a real-valued function may be utilized to identify if the additional computed variability value has reached to the estimated lowest image intensity variability value. For example, in some cases, the Newton-Raphson method may be utilized to identify if the additional computed variability value has reached to the estimated lowest image intensity variability value. In some case wherein the additional computed variability value has not reached to the estimated lowest image intensity variability value, the circuitry nay be instructed to initiate the pixel array capturing process as elaborated in FIG. 2A, as aforementioned. In such cases, the first image intensity variability value may be stored in the memory for additional utilization in the statistic and then a newly captured first image intensity variability value can be computed. In some cases, the circuitry may be instructed to operate more than three times In such an exemplary case, the comparison of the image intensity variabilities can utilize six image intensity variabilities. In some cases, more image intensity variabilities may be computed. At step 275 in case the computed variability value has reached to the estimated lowest image intensity variability value, the circuitry computerized instruction may set the clock rate associated with the lowest image intensity variability value as a value denoted herein as defined-clock-rate.

At step 280 the circuitry configures the pixel integration time to be essentially according to the defined-clock-rate as identified in step 275. Setting the clock rate of the circuitry as the defined-clock-rate may synchronize the cycle of an illumination modulation with the pixel integration time such that the amount of light received by the image sensor is essentially the same in each pixel integration time, and the length of the pixel integration time is at the same length of a full cycle of the illumination modulation, as explained below. In some cases, the circuitry may continue to capture images from the image sensor, wherein the clock rate of the circuitry may be set to the defined-clock-rate. In some other cases, capturing the images may be capturing sets of pixel arrays, as aforementioned.

Figure 3A:
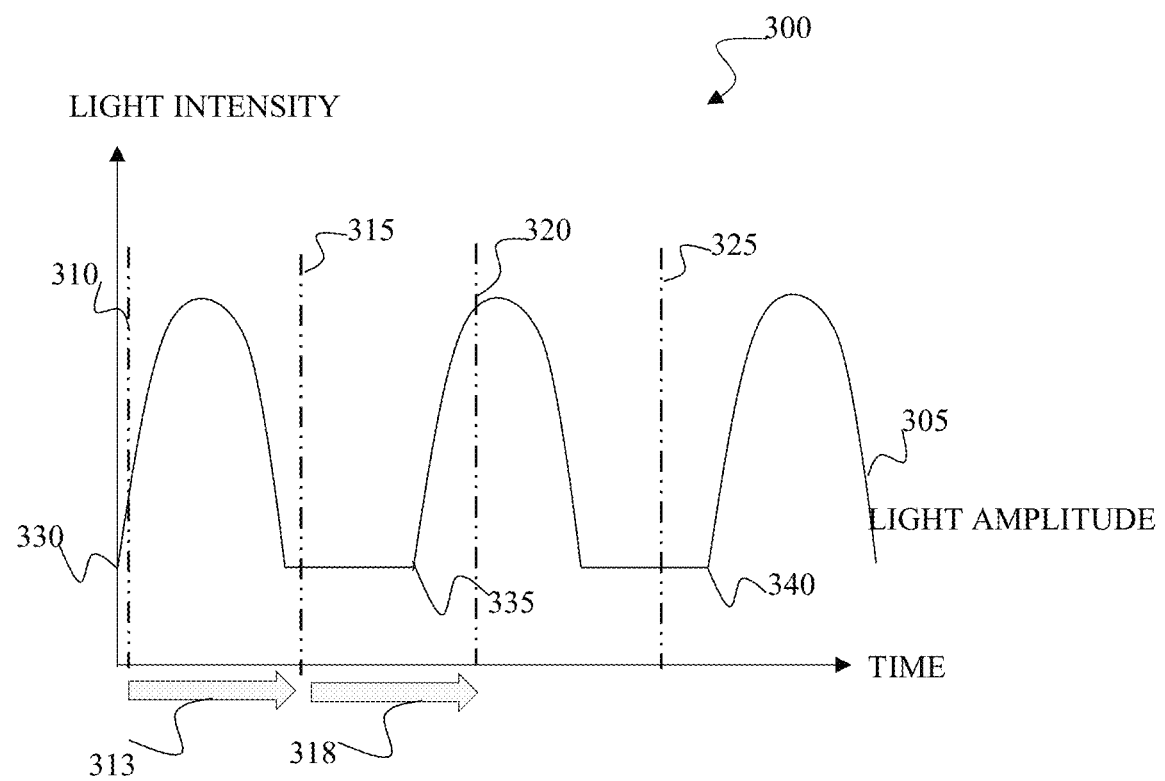
FIG. 3A shows a length of a pixel integration time unsynchronized with a full cycle of the illumination modulation, according to exemplary embodiments of the present inventing.

FIG. 3A shows a length of a pixel integration time unsynchronized with a full cycle of the illumination modulation, according to exemplary embodiments of the present inventing. FIG. 3A a graph 300 showing an amplitude 305 representing a condition of a condition of an illumination frequency wherein the light intensity varies according to illumination frequency of the light. The amplitude 305 may be unsynchronized with the pixel integration time managed by the circuitry. In such a case, the length of the pixel integration time defined by the clock rate may be at the same length of a full cycle of the illumination modulation. The pixel integration time can be seen at the time between the points defined by lines, 310, 315, 320, and 325. Graph 300 shows full cycles of the illumination modulation between points 330 and 335, and between points 335 and 340. Lines 310 and 315 demonstrating a pixel integration start points located out of sync with the illumination modulation. In such a case, the illumination modulation may not be synchronized with the pixel integration time and the amount of light received by an image sensor may be different in different frames. For example, the amount of light received between the lines 310 and 315, during the pixel integration time shown in arrow 313 may be different from the amount of light received between the lines 315 and 320 during the pixel integration time shown in arrow 318.

Figure 3B:
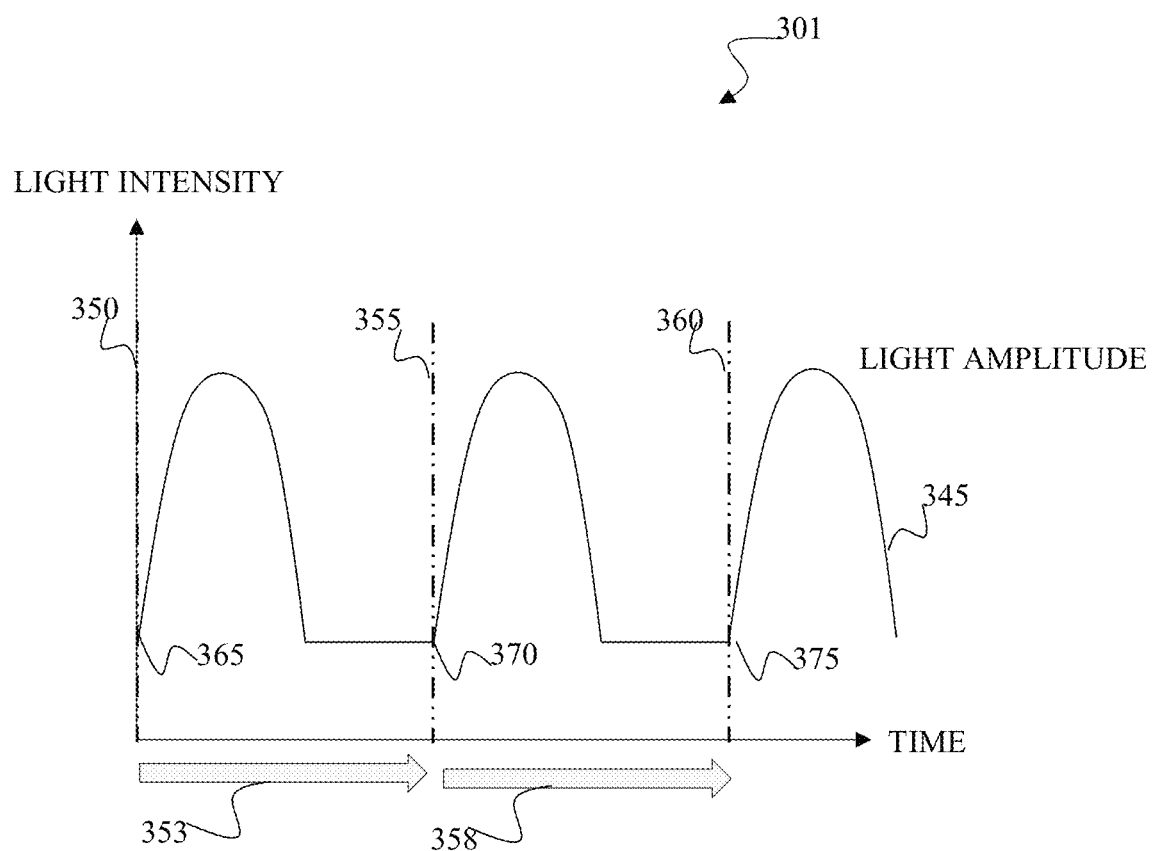
FIG. 3B shows a length of a pixel integration time synchronized with a full cycle of the illumination modulation, according to exemplary embodiments of the present inventing.

FIG. 3B shows a length of a pixel integration time synchronized with a full cycle of the illumination modulation, according to exemplary embodiments of the present inventing. FIG. 3B a graph 301 showing an amplitude 345 of the light intensity. The amplitude 345 represents a condition of an illumination frequency wherein the light intensity varies according to illumination frequency of the light. The amplitude 345 may be synchronized with the pixel integration time managed by the circuitry. In such a case, the length of the pixel integration time defined by the clock rate may be at the same length of a full cycle of the illumination modulation. Thus, the integration timing is synchronized with the illumination fluctuations. The pixel integration time can be seen at the time between the points defined by lines, 350, 355, and 360. Graph 301 shows full cycles of the illumination modulation between point 365 and point 370 during the pixel integration time shown on arrow 353. Graph 301 also shows full cycles of the illumination modulation between point 370 and point 375 during the pixel integration time shown on arrow 358, between lines 350 and 360. In such a case, the amount of light received by an image sensor may be the same in different frames. For example, the amount of light received between the lines 350 and 355 is essentially the same at the amount of light received between the lines 355 and 360.

In some embodiments of the present invention the length of the pixel integration time may be at the length of a full cycle of the illumination modulation multiple by an integer. For example, the pixel integration time may be at the length of three (3), or four (4) times of a full cycle of the illumination modulation.

Figure 4:
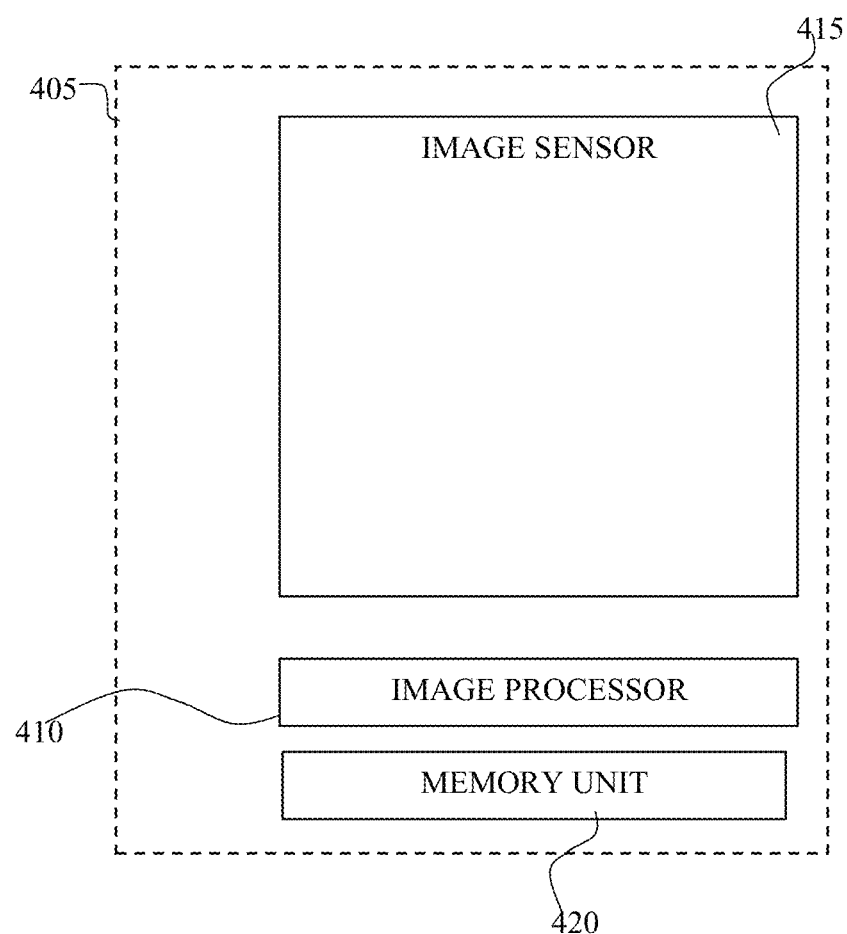
FIG. 4 shows a circuitry comprising an image sensor and a computing unit, according to exemplary embodiments of the present invention.

FIG. 4 shows a circuitry comprising an image sensor and a computing unit, according to exemplary embodiments of the present invention. FIG. 4 shows a circuitry 405 which in some cases, may be connected or implemented to electronic devices such as cellular telephones, cameras, video cameras, web cameras, computers, and the like. The circuitry 405 comprises an image sensor 415 which may comprise a photosensitive cell array and designed to transduce optical image of objects formed on the photosensitive cell array by incidence of light, into corresponding electronic signals. The circuitry 405 also comprises an image processor 410 designed to receive the signals from the image sensor 415. The image processor 410 may be configured with computerized instructions for changing the pixel integration time by modifying the clock rate and thereby adjusting the number of clock cycle to the number of clock cycles required to complete a pixel integration time. The of computerized instructions may also be utilized to manage some of the operational tasks of the image processor 410. For example, the image processor 410 may be instructed by computerized instructions to compute the variability of the light intensity of the captured pixel array.

The circuitry 405 may also comprise a memory unit 420 which may be a computer-readable storage medium designed to store digital files representing digital images. In some cases, the data stored in the memory unit may be a computer readable data representing a digital image captured by light incident on an image sensor 405. In some other cases the memory unit 420 may store the data resulted in the image processor 410 operational tasks. For example, the memory unit 420 may be utilized to store the values representing the light intensity measure by the image sensor 415.

The circuitry 405 may also be configured with the computerized instruction to operate the image processor such that, the circuitry can capture at least three sets of pixel arrays, wherein the method of capturing a set of pixel arrays can be configured to set a clock rate associated with an image intensity value, wherein the clock rate defines the number of clock cycles per pixel integration time by defining the clock rate of the circuitry, capture a set of pixel arrays, wherein said set of pixel arrays represents a digital image captured by the image sensor, and wherein the image sensor captures pixel arrays provided in a condition of an illumination frequency, and compute the image intensity variability value of the captured set of pixel arrays.

The circuitry 405 may also be configured to utilize the image intensity variability values associated with the at least three sets of pixel arrays to compute the estimated lowest image intensity variability value, set the clock rate associated with the image intensity variability value computed as the estimated lowest image intensity variability value to be the defined-clock-rate, and capture images from the image sensor, by the circuitry, wherein the clock rate of the circuitry is set to be the defined-clock-rate.

Figure 5:
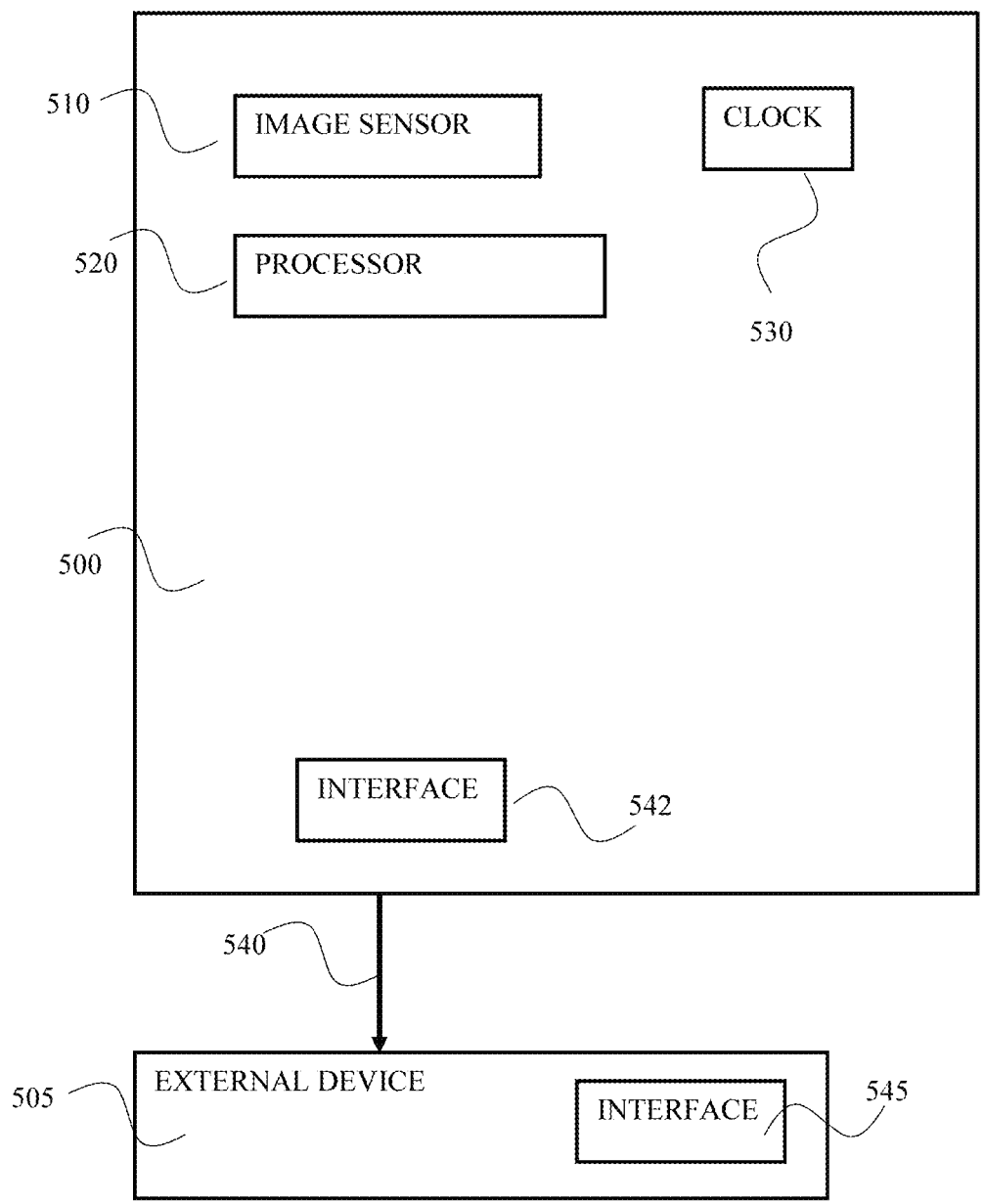
FIG. 5 shows a circuitry used to adjust a clock rate of a clock-dependent device based on a measured flicker, according to exemplary embodiments of the present inventing.

FIG. 5 shows a circuitry used to adjust a clock rate of a clock-dependent device based on a measured flicker, according to exemplary embodiments of the present inventing. The circuitry 500 comprises an image sensor 510 for capturing images. The image sensor 510 may be a camera, an Infra-Red sensor, and even an antenna capturing a reflected wireless signal and reconstructing an image from the signal. The images captured by the image sensor 510 may be stored in a memory device of the circuitry 500. The memory device may be a volatile memory or a non-volatile memory.

The circuitry 500 also comprises an image processor 520 configured to analyze the images captured by the image sensor 510. The image processor 520 may compute a flicker-related parameter such as intensity, amplitude, variance etc. based on image data of the captured images. The image processor 520 may also compute an adjustment required for the clock rate of the clock-dependent device 505 coupled to the circuitry 500 as described above. The adjustment of the clock rate may be based on a set of rules stored in the circuitry's memory. The adjustment of the clock rate is based on the computed flicker value. Some flicker values may result in increasing the clock rate, while some flicker values may result in decreasing the clock rate of the clock-dependent device 505. The clock-dependent device 505 may interact with external devices, such as data storage, data transmission or processing, servers, and therefore clock-dependent device 505 is required to operate using an accurate clock rate.

The system may also comprise a communication interface enabling passage of data between the circuitry 500 and the clock-dependent device 505. The interface may include a cable 540 or connectors, for sending the new clock rate value or a value representing the value to the clock-dependent device 505. The interface may run over a wireless communication network.

The circuitry 500 may also comprise a clock 530 used to control the timing of the components in the circuitry, such as the image sensor 510. The clock 530 generates the clock pulses, for example 60,000 cycles per second. The clock rate of the clock 530 is adjusted according to the adjustment determined by the image processor 520 based on the flicker measured from the images captured by the image sensor 510.

The circuitry 500 may also comprise an output interface 542, for sending and receiving data, images, image parts, or analysis results from image processor 520 to any application or any need, such as a controller, data storage, display, a memory device, further analysis, or the like.

The clock-dependent device 505 may also comprise an output interface 545, for receiving images, image parts, or analysis results and outputting the same to any application or any need, such as a display, a memory device, further analysis, or the like.

Figure 6:
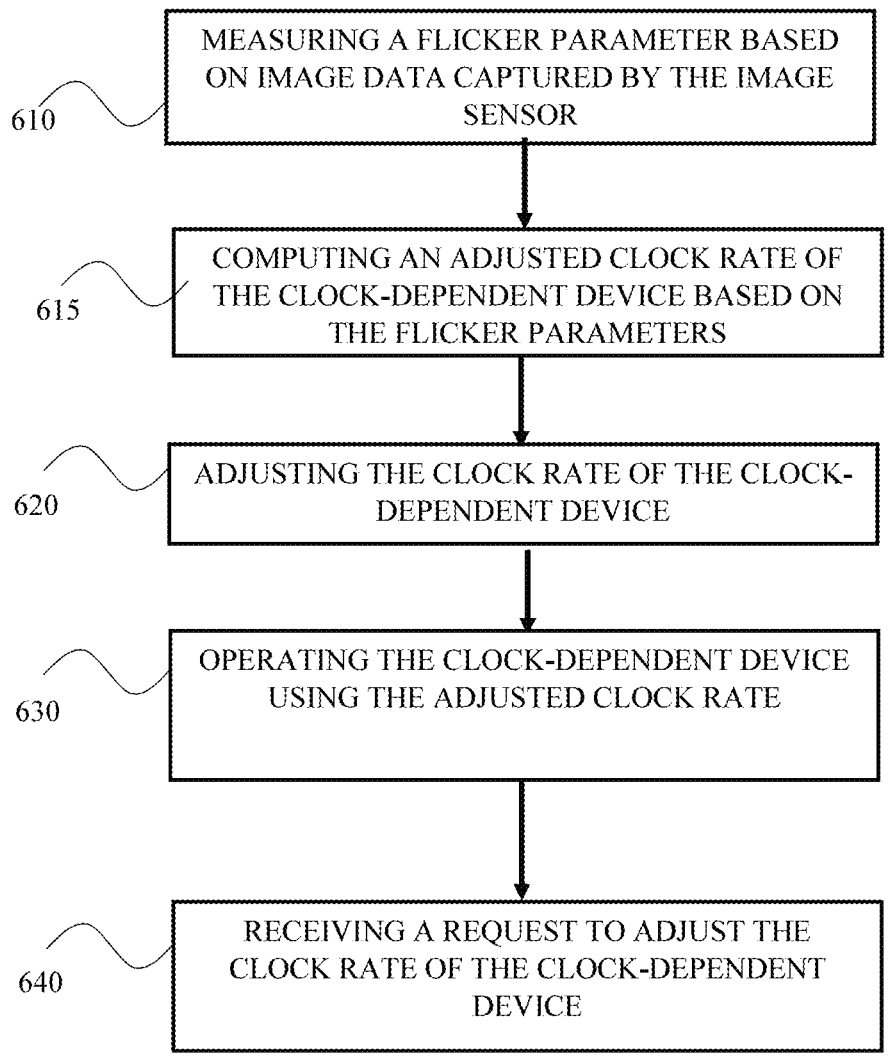
FIG. 6 shows a method for adjusting a clock rate of a clock-dependent device based on a measured flicker, according to exemplary embodiments of the present inventing.

FIG. 6 shows a method for adjusting a clock rate of a clock-dependent device based on a measured flicker, according to exemplary embodiments of the present inventing.

Step 610 discloses measuring a flicker parameter based on image data captured by the image sensor. Flicker may be defined as a periodic difference in brightness between image frames, for example subsequent images captured by the image sensor, or between image lines in the same mage. By measuring flicker parameters in at least three digital images captured by the image sensor, an estimate can be made of the required clock adjustment that would minimize or eliminate flicker. If necessary, the procedure can be repeated to increase accuracy. The digital images are captured in a specific condition of an illumination frequency. The flicker parameter may then be computed based on image intensity variability values for the captured digital images. The flicker may be stored in the circuitry's memory.

Step 615 discloses computing an adjusted clock rate of the clock-dependent device based on the flicker. The clock rate may be increased or decreased based on the flicker and a set of rules. The rules may be stored in the circuitry's memory or in a remote device, such as a server communicating with the circuitry. The clock rate may be adjusted in a whole number of cycles per second, for example from 60,000 cycles per second to 60,005 cycles per second.

Step 620 discloses adjusting a clock rate of the clock-dependent device. The adjusting may be performed by setting a new clock rate value in a data field in the memory of the clock-dependent device. The adjusting may be performed by sending the new clock rate value or a value representing the value to the clock-dependent device, for example over a connector or a cable connecting the circuitry and the clock-dependent device or a wireless connection such as Wi-Fi, Bluetooth and the like. In some exemplary cases, adjusting the clock rate may be performed by setting a property in an analog device, for example a value in a memory address of the analog device.

Step 630 discloses operating the clock-dependent device using the adjusted clock rate. The clock-dependent device has a clock used for the clock-dependent device operation. In case the clock is relatively old, the number of clock cycles need to be updated or adjusted for the proper operation of the clock-dependent device. For example, to enable the clock-dependent device to be synchronized with another device.

Step 640 discloses receiving a request to adjust the clock rate of the clock-dependent device. The request may be received from a remote device, such as a server communicating with the circuitry. In some cases, the request may be provided periodically, for example once a week, or once after capturing 10,000 images by the image sensor. In some other cases, the request may result from a predefined event.

The event may result from an environmental condition, such as measuring the temperature or humidity in the vicinity of the circuitry, or based on image data, for example in case a property of one or more images captured by the image sensor exceeds a threshold.

In some exemplary cases, the method can be used to synchronize timing of multiple cameras. In such cases, the flicker is computed according to images captured by one of the multiple cameras, and a signal is sent to clocks coupled to the other cameras, to adjust the clock rate as elaborated above, based on the flicker and rules that apply the computed flicker on the change of the clock rate. Alternatively, flicker calibration may be performed in parallel by a flicker computed based on images captured by each of the cameras.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A method operable by a circuitry, said circuitry comprising an image processor, an image sensor comprising a plurality of pixel arrays, and another clock-dependent device, comprising:
    capturing at least one image by the image sensor;
    the image processor receiving the at least one image and measuring a flicker parameter using the at least one image captured by the image sensor;
    adjusting a clock rate of the circuitry, thereby adjusting the operation of the image processor, image sensor and the another clock-dependent device according to the measured flicker parameter; and
    operating the clock-dependent device using the adjusted clock rate.

2. The method of claim 1, where the clock-dependent device is an interface communicating with an external device.

3. The method of claim 1, wherein setting the clock rate of the circuitry is performed by updating a data field in a memory of the circuitry.

4. The method of claim 1, wherein setting the clock rate of the circuitry is performed periodically.

5. A circuitry comprising an image sensor comprising a plurality of pixel arrays, an image processor coupled with a memory unit and another clock-dependent device, wherein the circuitry is configured with computerized instructions, comprising:
    measuring a flicker parameter using at least one image captured by the image sensor;
    adjusting a clock rate of the circuitry, thereby adjusting the operation of the image processor, image sensor and the another clock-dependent device according to the measured flicker parameter; and
    operating the clock-dependent device using the adjusted clock rate.

6. The circuitry of claim 5, where the clock-dependent device is an interface communicating with an external device.

7. The circuitry of claim 6, where the external device is a processor.

8. The circuitry of claim 5, wherein setting the clock rate of the circuitry is performed by updating a data field in a memory of the circuitry.

9. The circuitry of claim 5, wherein setting the clock rate of the circuitry is performed periodically.

10. The circuitry of claim 6, where the external device comprises a second camera, wherein the clock rate used by the second camera is adjusted based on the flicker parameter.

11. The circuitry of claim 5, further comprising an output interface for sending and receiving images, image parts, or analysis results from the image processor to the clock-dependent device.

12. The method of claim 4, wherein setting the clock rate of the circuitry is performed every predetermined period of time, or after capturing a predetermined number of images by the image sensor.

13. The circuitry of claim 9, wherein setting the clock rate of the circuitry is performed every predetermined period of time, or after capturing a predetermined number of images by the image sensor.

* * * * *